United States Patent [19]
Raith et al.

[11] Patent Number: 6,115,596
[45] Date of Patent: Sep. 5, 2000

[54] SYSTEMS AND METHODS FOR HANDLING EMERGENCY CALLS IN HIERARCHICAL CELL STRUCTURES

[75] Inventors: Alex K. Raith, Durham; Rajaram Ramesh, Cary; R. David Koilpillai, Apex, all of N.C.

[73] Assignee: Ericsson Inc., Research Triangle Park, N.C.

[21] Appl. No.: 08/839,859

[22] Filed: Apr. 22, 1997

[51] Int. Cl.[7] .................................................. H04Q 7/38
[52] U.S. Cl. .......................... 455/404; 455/521; 455/449; 455/456
[58] Field of Search ...................... 455/404, 455, 455/449, 100, 95, 115, 414, 422, 521, 444, 515, 456

[56] References Cited

U.S. PATENT DOCUMENTS

| | | | |
|---|---|---|---|
| 4,839,892 | 6/1989 | Sasaki | 370/348 |
| 5,175,867 | 12/1992 | Wejke et al. | 455/33.1 |
| 5,327,144 | 7/1994 | Stilp et al. | 342/387 |
| 5,353,332 | 10/1994 | Raith et al. | 379/59 |
| 5,499,386 | 3/1996 | Karlsson | 455/33.2 |
| 5,732,125 | 3/1998 | Oyama | 455/404 |
| 5,742,666 | 4/1998 | Alpert | 455/404 |

FOREIGN PATENT DOCUMENTS

| | | |
|---|---|---|
| 717574 | 6/1996 | European Pat. Off. . |
| WO95/24102 | 8/1995 | WIPO . |
| WO96/04155 | 2/1996 | WIPO . |

OTHER PUBLICATIONS

International Search Report re PCT/US98/06496 Date of mailing of search: Nov. 19, 1998.

Louis A. Stilp, "*Time Difference of Arrival Technology for Locating Narrowband Cellular Signals*", Proceedings of the SPIE, vol. 2602, pp. 134–144 (1996).

*Primary Examiner*—Fan Tsang
*Assistant Examiner*—Philip J. Sobutka
*Attorney, Agent, or Firm*—Burns, Doane, Swecker & Mathis, L.L.P.

[57] ABSTRACT

Emergency call handling may, in the near future, require terminal unit location information to be provided to emergency service centers. Exemplary embodiments of the present invention facilitate the provision of this information by reducing a number of monitoring stations needed to track terminal location based upon control channel access. First, mobile units placing emergency calls can be forced to used designated control channels which may differ from control channels to which they are currently listening. Second, mobile units may be required to transmit at greater than specified power levels so that monitoring stations receive their emergency call access.

19 Claims, 6 Drawing Sheets

SYSTEMS AND METHODS FOR HANDLING EMERGENCY CALLS IN HIERARCHICAL CELL STRUCTURES

BACKGROUND

Applicants' invention relates generally to radiocommunication systems, e.g., cellular or satellite systems and, more particularly, to techniques for supporting and enhancing emergency calling procedures in such systems.

The growth of commercial radiocommunications and, in particular, the explosive growth of cellular radiotelephone systems have changed the ways in which people communicate. One survey indicates that about 80% of the people who purchase mobile communication units and service subscriptions do so to enhance their personal security. Presumably, many of these subscribers would expect to use their mobile units to aid them in urgent situations, e.g., when their vehicle has become disabled or in an emergency situation requiring rapid medical and/or police response. In these circumstances it would be desirable that the radiocommunication system be able to independently determine a location of the mobile unit, particularly in the case where the subscriber does not know his or her precise location. Moreover, it is expected that the FCC will soon require that network operators forward the position of an emergency caller to the emergency service provider.

There are many techniques available to generate mobile unit location information. In a first category, the mobile unit could estimate its own position and send a message with its coordinates when placing an emergency call. This could be accomplished by, for example, providing the mobile unit with a Global Positioning System (GPS) receiver that receives location information from the GPS satellite network. The mobile unit can then transmit this information to the system, which would then forward it to the emergency service provider. This requires, however, significant modification of existing mobile units to include GPS receivers, as well as additional signalling between the mobile units and base stations.

Alternatively, the base stations which transmit signals to, and receive signals from, the mobile units could be used to determine the mobile unit's location. Various techniques, including attenuation of a mobile unit's signal, angle-of-arrival, and difference between the time-of-arrival (TDOA) of a mobile unit's signal at different base stations, have been suggested for usage in providing mobile unit location information. See, for example, the article entitled "Time Difference of Arrival Technology for Locating Narrowband Cellular Signals" by Louis A. Stilp, SPIE Vol. 2602, pp. 134–144. These solutions also have their drawbacks including the need to modify the many existing base stations, e.g., to provide array antennas to support angle-of-arrival techniques or to synchronize base station transmissions to support TDOA techniques.

Figure 1:
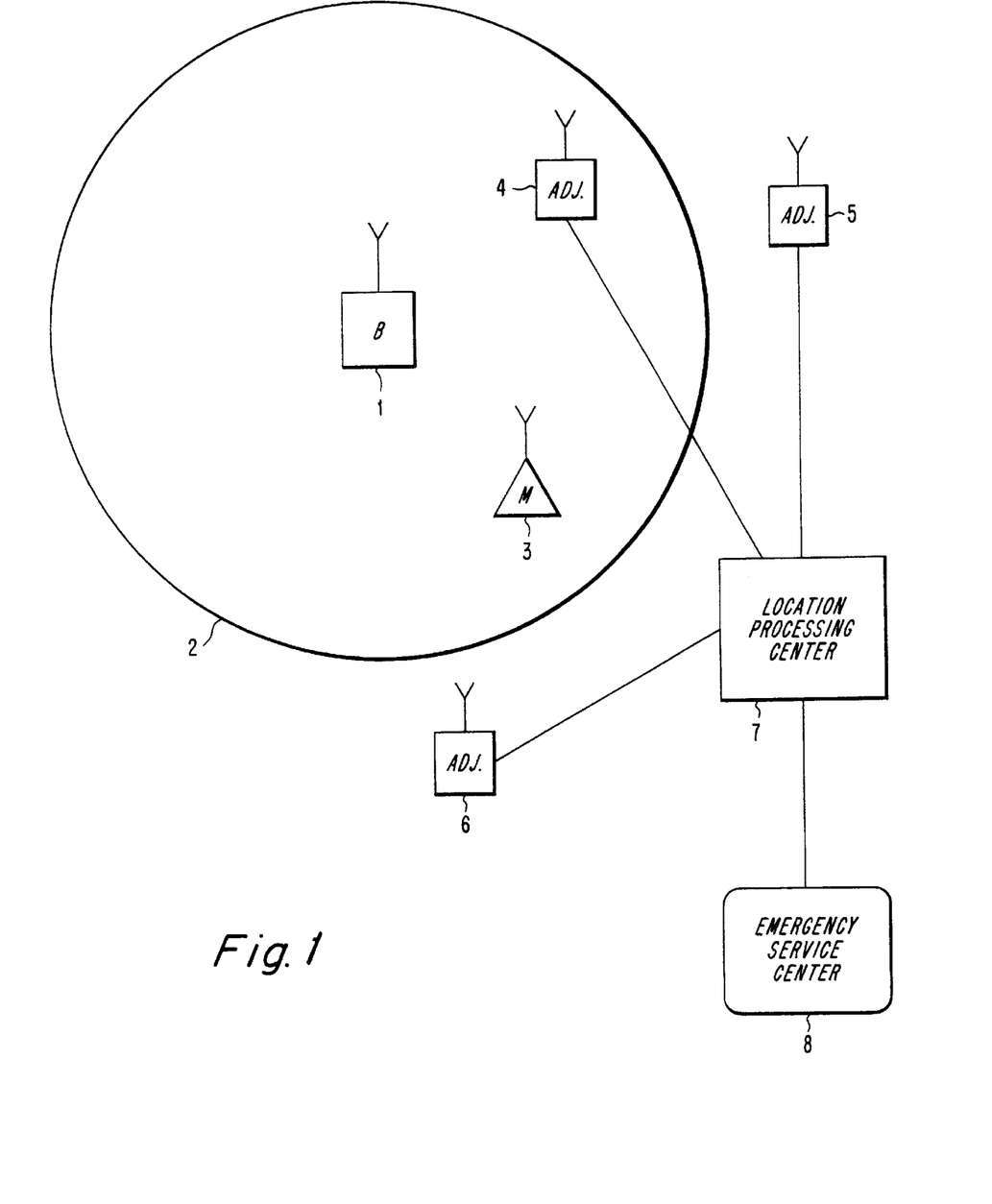
FIG. 1 is a diagram of an exemplary cellular radio telephone system in which the present invention may be applied.

A third category of strategies for locating mobile units in radiocommunication systems involves the provision of an adjunct system, i.e., a system which may be completely independent of the radiocommunication system or which may share various components (e.g., an antenna) with the radiocommunication system but which processes signals separately therefrom. This may be advantageous, for example, as an expedient solution to providing mobile unit location without modifying the large number of existing base stations in a system. For example, consider the equipment illustrated in FIG. 1 wherein the adjunct scanning units are not co-located with the base stations of radiocommunication system. Therein, a base station 1 supports radiocommunication within cell 2 and, in particular with mobile unit 3. An adjunct system, partially shown by way of scanning units 4, 5 and 6, monitors accesses to the system by mobile unit 3. When mobile unit 3 makes an emergency access, adjunct units 4, 5 and 6 use the mobile unit's transmissions on either a control channel or a traffic channel to provide information to a location processing center 7. The location processing center then uses the information provided by the various adjunct units to, for example, triangulate the position of mobile unit 3 and report this position to an emergency service center 8. More details regarding exemplary usages of adjunct systems can be found in U.S. Pat. No. 5,327,144 to Stilp et al., entitled "Cellular Telephone Location System", the disclosure of which is incorporated here by reference.

However, using an adjunct system to locate mobile stations in support of, for example, emergency call processing, also poses several challenges. One of these challenges involves monitoring the location of mobile units operating in hierarchical, or multi-layered, cell structures used in today's radiocommunication systems in high traffic areas to provide adequate capacity and efficient bandwidth utilization. These hierarchical cell structures include, for example, overlapping combinations of macrocells, indoor microcells, outdoor microcells, public microcells and restricted or private microcells.

Figure 2:
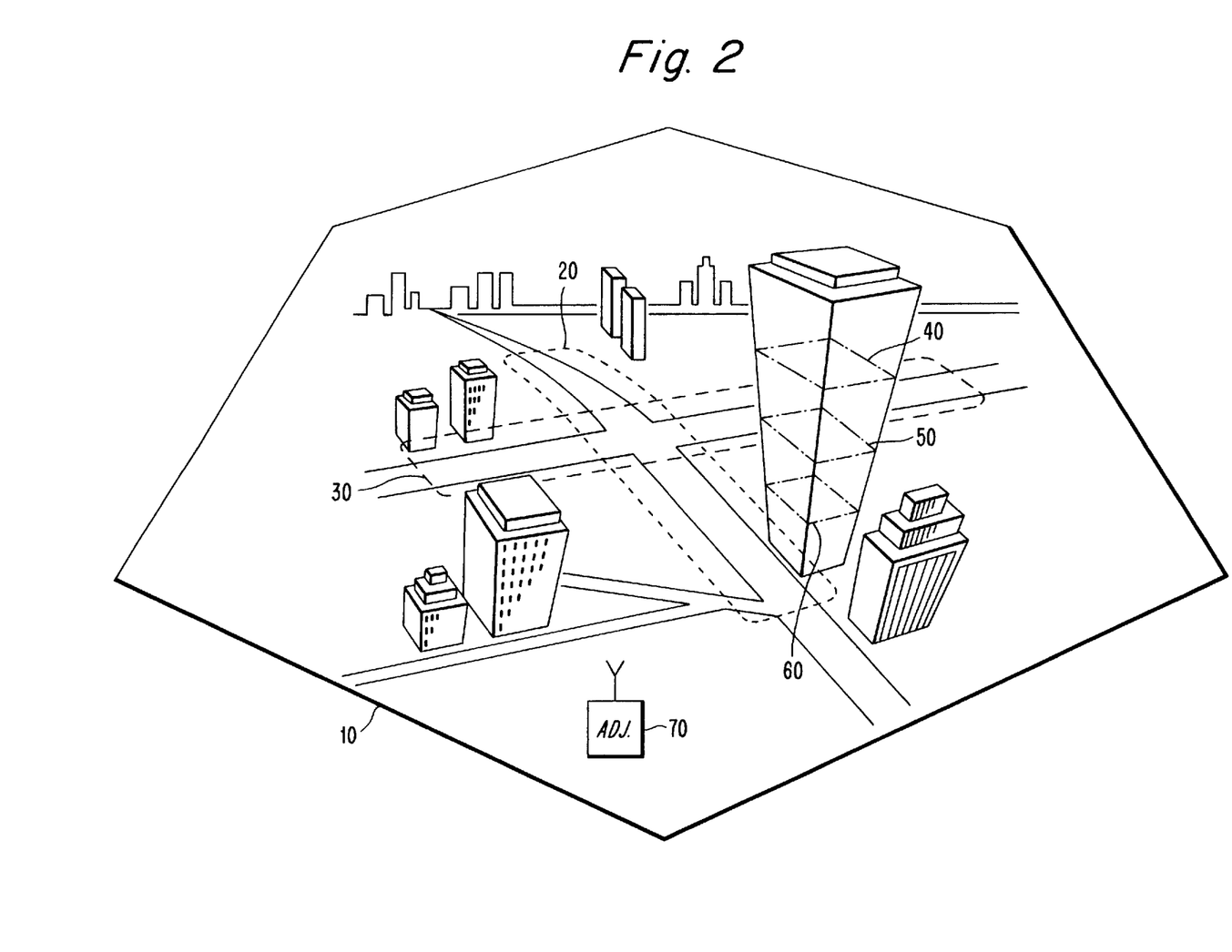
FIG. 2 illustrates an example of a hierarchical cell structure in which the present invention may be applied.

FIG. 2 illustrates an exemplary hierarchical cell structure. An umbrella or macrocell 10, represented by a hexagonal shape in this figure, provides a first, relatively large area of radiocommunication service. Within umbrella cell 10 are microcell 20 (represented by the area enclosed within the dotted line) and microcell 30 (represented by the area enclosed within the dashed line) which provide radiocommunication service to corresponding areas along city streets. Even smaller cells 40, 50 and 60, sometimes referred to as picocells, may be established on floors of a building to provide radiocommunication service to high density, indoor users.

Each of the cells 10–60 illustrated in FIG. 2 will include a base station (not shown) which support radiocommunication within their illustrated cell areas. In some cells, particularly those like indoor picocells 40, 50 and 60, radiocommunication may be conducted at relatively low power levels due to the proximity between the remote units and the base station within each picocell. Consider a remote unit, e.g., a portable or mobile phone, which is travelling down the city streets and up into the building including picocells 40, 50 and 60. During various portions of this transit, potentially all of the base stations associated with the umbrella cell 10, the microcells 20 and 30 and the picocells 40, 50 and 60 may provide service to the remote unit. Thus, should an emergency occur at some point during the remote unit's transit and the user place an emergency call, any one of cell 10–60's base stations (and corresponding control channels) might conventionally be used to request emergency services.

This situation provides a dilemma for systems wherein, for example, mobile unit location information is determined using an adjunct system. More specifically, it may not be possible to scan the transmissions of mobile and base stations anywhere within umbrella cell 10 using only one (or even more) adjunct scanning units. For example, if the transmissions within picocells 40, 50 and 60 are specified to be made at a relatively low power, then an adjunct scanning station 70 may not receive an emergency call transmitted by a mobile unit served by one of these cells and, therefore, would not be able to provide location information to an emergency center. One solution to this problem would be to provide adjunct units within each of these cells, as well as possibly elsewhere within umbrella cell 10, to provide sufficient adjunct coverage to locate a mobile station placing an emergency call through any of the base stations in the cell.

Increasing the number of adjunct units is, however, economically unattractive due to the increase in cost associated with implementing such a system. Accordingly, it would be desirable to provide some alternative techniques for handling emergency call processing and location of mobile stations which does not require the provision of a large number of adjunct units.

SUMMARY

According to exemplary embodiments of the present invention, when a remote unit initiates an emergency call, the remote unit first checks to see if it is locked to an appropriate control channel. If, for example, the remote unit is locked or listening to a control channel which has not been designated for emergency call handling (e.g., a control channel associated with an indoor picocell that is not being monitored by an adjunct station), then the remote unit switches to another control channel (e.g., a control channel associated with the umbrella cell) prior to accessing the radiocommunication system to place the emergency call.

As a precursor to evaluating its current control channel, the remote unit needs to first identify the call as an emergency call. There are several exemplary techniques for performing this function. For example, the remote unit can compare the number dialed by the user with a data base or list of emergency numbers stored in the remote unit. Alternatively, the remote unit may be equipped with a keypad having a designated emergency call button which can be pressed by the user to initiate an emergency call.

According to exemplary embodiments of the present invention, the remote unit can review a stored emergency call handling indication associated with its current control channel to determine if the remote unit should tune to a different control channel prior to accessing the system. This emergency call handling indication can be broadcast by the system, e.g., on a broadcast control channel, and stored in the remote unit. Similarly, if the current control channel is not designated for emergency calls, then the remote unit can review stored indications for other neighboring control channels to identify an appropriate control channel for emergency system access.

In this way, an adjunct system can be deployed wherein adjunct scanning units need only monitor system accesses made on certain designated control channels, e.g., those associated with umbrella cells, to identify emergency calls and provide remote unit location information to emergency centers. Thus, the number of adjunct scanning units can be reduced, particularly for those systems which use layered cell structures employing many base stations and control channels within a relatively small geographical area.

Another exemplary embodiment provides for a remote unit which is disposed within the service area which uses low (or less than maximum) transmit power (e.g., low power picocells) to ignore the transmit power level conventions for the cell when placing an emergency call by transmitting at a higher power level. This eases adjunct scanning unit positioning requirements since the units will, presumably, be able to receive these transmissions at approximately the same signal strength as if the mobile stations were accessing the system via the umbrella cell.

BRIEF DESCRIPTION OF THE DRAWINGS

The features and advantages of Applicants' invention will be understood by reading this description in conjunction with the drawings, in which.

DETAILED DESCRIPTION

The following description is scripted in terms of a cellular radiotelephone system, but it will be understood that Applicants' invention is not limited to that environment and may be used in other types of wireless systems, e.g., systems which provide radiocommunication service using satellites, voice-trunked systems such as Land Mobile Radio (LMR) or Special Mobile Radio (SMR) systems, etc. Also, while the exemplary embodiments described below are provided in the context of Time Division Multiple Access (TDMA) communication systems, it will be understood by those skilled in the art that the present invention may be applied to systems using any access methodology, e.g,. Frequency Division Multiple Access (FDMA), Code Division Multiple Access (CDMA) and hybrids of FDMA, TDMA and/or CDMA.

Consider, solely for the purposes of example, the prevalent digital cellular radiotelephone system in North America known as the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVCs) and TDMA digital traffic channels (DTCs), and the system operator can dynamically replace one type with the other to accommodate fluctuating traffic patterns among analog and digital users. The AVCs and DTCs are implemented by frequency modulating radio carrier signals, which have frequencies near 800 megahertz (MHz) such that each radio channel has a spectral width of 30 kilohertz (KHz).

The IS-54-B standard also provides for a number of analog control channels (ACC) on which system accesses can be initiated and system overhead information can be communicated to the mobile units. A subsequent standard, referred to as IS-136, adds specifications for digital control channels (DCCs), which standard is incorporated here by reference.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. According to IS-54B and IS-136, each TDMA frame consists of six consecutive time slots and has a duration of 40 milliseconds (msec). Thus, each frame can carry from one to six channels (e.g., one to six radio connections), which may be a mixture of DTCs and DCCs used to convey information between a base station and a mobile station.

Figure 3:
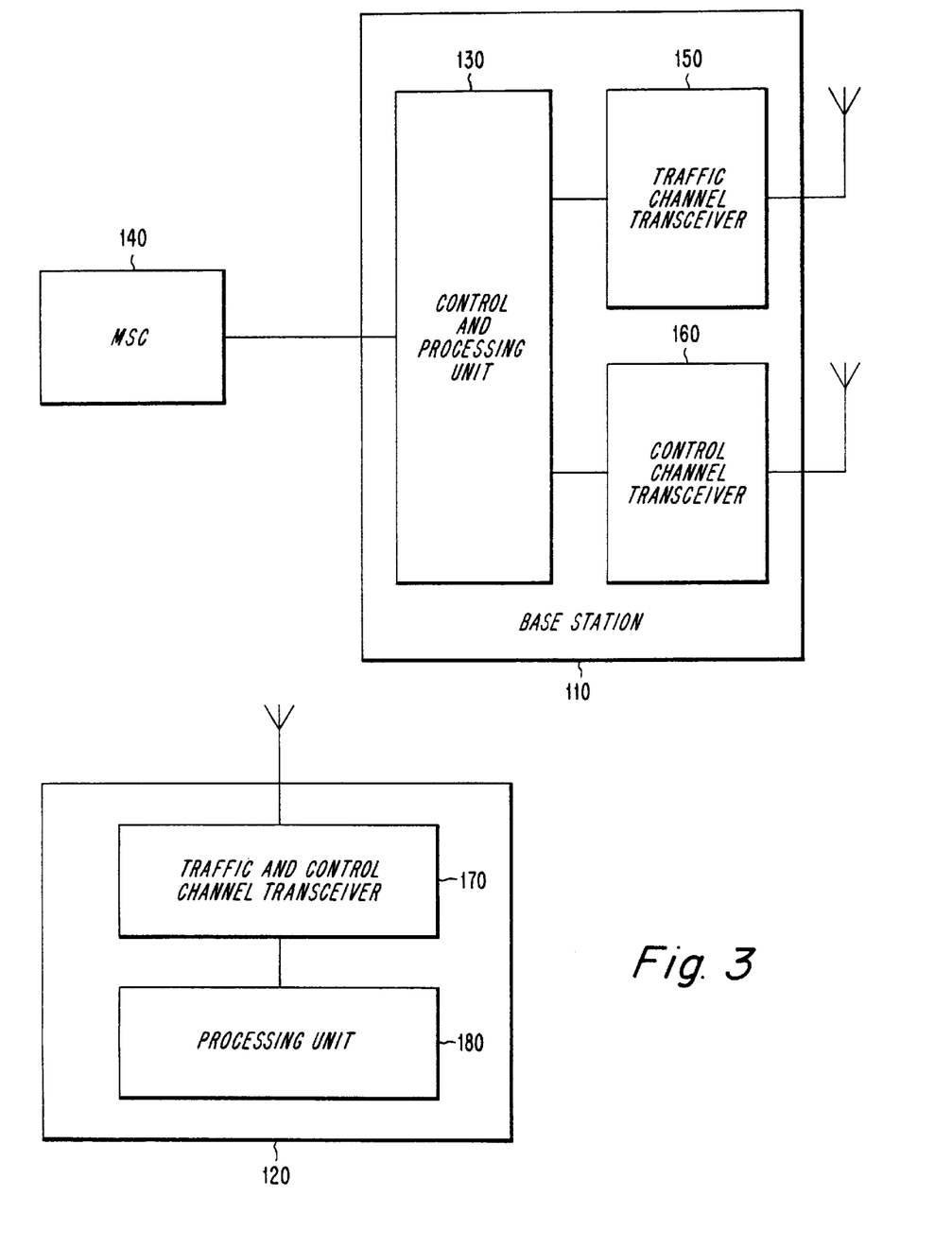
FIG. 3 illustrates an exemplary base station and mobile unit which may operate in accordance with the present invention.

FIG. 3 represents a block diagram of an exemplary cellular mobile radiotelephone system, including an exemplary base station 110 and mobile unit 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent application Ser. No. 07/967,027 entitled "Multi-Mode Signal Processing," which was filed on Oct. 27, 1992, both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency.

After an idle mobile unit 120 has located a control channel, e.g., by using digital control channel location information found on a traffic channel, it can then read the control information transmitted on that control channel, e.g., paging messages, using its traffic and control channel transceiver 170. For more detailed information relating to techniques for locating digital control channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference. When a connection between the mobile station 120 and the system is desired, the transceiver 170 will tune to a traffic channel assigned thereto by the system.

Once the mobile unit has found a control channel which satisfies a minimum set of rules, e.g., the mobiles must be able to receive the channel above a minimum received signal strength, the mobile may further evaluate this control channel with regard to certain system preferences stored in the mobile unit. For example, if the cell is barred (as described in IS-136), or the cellular operator is not the preferred operator (using the System Operator Code in IS-136), the mobile unit may then try to find another control channel.

If the data broadcast by the cellular system on the control channel (this part of the DCC is often referred as to the Broadcast Control Channel or BCCH) satisfies the preferences stored in the mobile unit, the mobile unit will listen or lock to this control channel to listen for paging messages and/or transmit call origination messages. At the same time, however, the mobile unit prepares for potential cell reselection since the mobile may be traveling and leaving the coverage area of the first selected control channel. Many known techniques exist for informing a mobile unit where (e.g., using one or more of frequency, time, and code) the neighboring control channels can be found in order for mobile units to test and compare these candidates with the current control channel to find the best control channel to serve the mobile unit given its current position. See, for example, U.S. Pat. No. 5,353,332 to Raith and Muller, entitled "Method and Apparatus for Communication Control in a Radiotelephone System" or U.S. Pat. No. 5,499,386, entitled "Best Server Selection in Layered Cellular Radio System" to Karlsson, the disclosures of which are incorporated here by reference.

Returning to FIG. 2, as an idle (i.e., not connected to the system via a traffic channel but listening to a control channel) mobile unit (not shown) travels between the various cells, the above-described reselection process will cause the mobile unit to switch between different control channels. For example, the mobile unit may first listen to a control channel transmitted by a base station (not shown) associated with microcell 20 and, as the mobile unit travels into a building, may then listen to a control channel transmitted by a base station associated with picocell 40. As mentioned above, however, this poses a problem if the transmissions within picocell 40 are specified to be at a relatively low power level, as is common for indoor picocells to reduce overall interference levels. Under these circumstances, if a mobile unit accesses the system to place an emergency call using a control channel associated with picocell 40, then the adjunct scanning unit 70 will not identify the emergency call and will not pass location information along to an emergency service center.

This difficulty is overcome according to a first exemplary embodiment of the present invention wherein, when a mobile unit initiates an emergency call, the mobile unit first checks to see if it is currently locked to an appropriate control channel. If, for example, the mobile unit is locked or listening to a control channel which has not been designated for emergency call handling (e.g., a control channel associated with indoor picocell 40 that is not being monitored by adjunct scanning unit 70), then the mobile unit switches to another control channel (e.g., a control channel associated with the umbrella cell 10) prior to accessing the radiocommunication system to place the emergency call. In this way, adjunct scanning unit 70 need only monitor system accesses placed on control channels associated with umbrella cell 10 and additional adjunct units need not be positioned to listen to each of the control channels associated with low power picocells 40, 50 and 60. Techniques whereby adjunct scanning units identify and/or are assigned to monitor particular control channels, e.g., particular umbrella cells control channels, are described in U.S. patent application Ser. No. 08/840,590, entitled "Systems and Methods for Locating Remote Units Operating in a Radiocommunication System", filed on Apr. 22, 1997, the disclosure of which is incorporated here by reference.

An exemplary method for handling emergency calls in a radiocommunication system according to the present invention will now be described with respect to the flowchart of FIG. 4. Initially, at block 400, the remote unit first determines whether the call is an emergency call. Perhaps the best known emergency number in the United States is 911. However, even within the United States there are other emergency numbers (e.g. that associated with the U.S. Virgin Islands). Moreover, recent trends indicate a surge in the usage of 911 calls for relatively low-priority emergencies, which trends have led to discussions of adding one or more other low-priority emergency numbers (e.g., 811) to reduce the load on emergency centers and reduce response time for more urgent situations. Thus, one possibility for identifying emergency calls is to provide the mobile unit with a data base having all possible emergency call numbers. This data base can be stored in a memory device within the mobile station either at manufacturing or can be downloaded later as part of, for example, the Over the Air-interface Teleservice (OATS) defined in IS-136. For GSM systems, the Subscriber Interface Module (SIM) card can contain this data base. Then, each time a number is dialed into the mobile unit, that number can be compared with the data base or list of emergency numbers to determine if the call is an emergency call.

This technique is somewhat complicated by the consideration that a user may travel to a different country or region which uses different numbers for emergency calls than those used in its home country or region. Thus, it may be desirable to group the emergency numbers by country or region in the data base and provide the mobile unit with information as to the country or region in which it is currently operating so that a comparison is made with an appropriate group of emergency numbers in the data base. For example, the mobile unit can determine the country in which it is located, in some systems, by reading the country code sent on the broadcast channel. Then, if a number entered by the user matches one of the stored numbers and this stored number has an associated country code equal to that currently sent on the broadcast control channel, the mobile unit determines this call to be an emergency call at step 400.

Another alternative, which limits the burden on correctly programming the mobile units, is for the system to broadcast the local emergency number. This number can then be displayed to the user on a display associated with the mobile unit, for example, whenever the emergency number(s) change as the mobile unit moves from cell to cell.

In addition to using the dialed number to identify an emergency call, according to another exemplary technique a special button, key or key sequence can be provided on the mobile station that is associated with emergency calls. In this exemplary implementation, the user simply presses this button, key or key sequence to initiate contact with an emergency service center.

Figure 4:
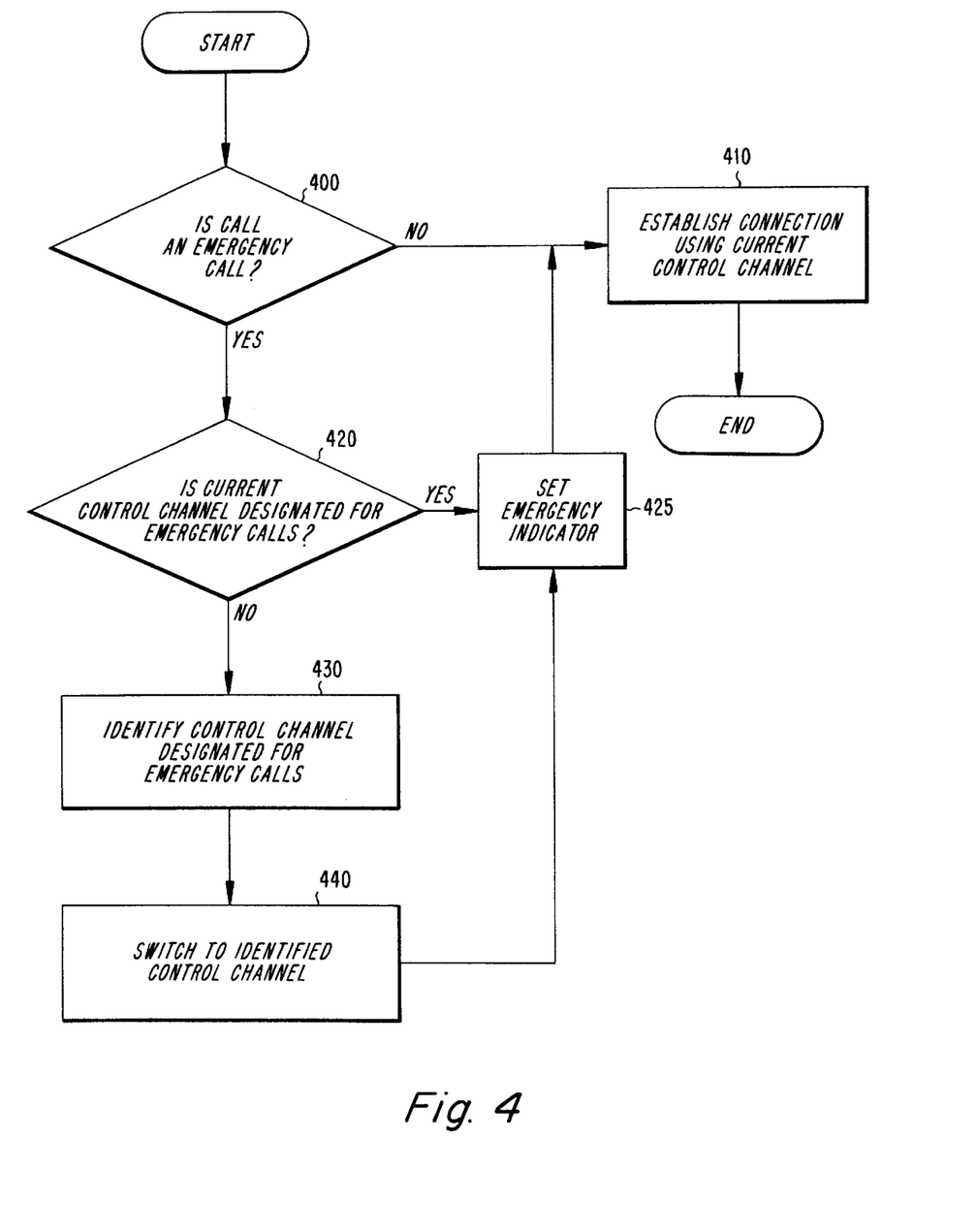
FIG. 4 is a flow chart illustrating a first exemplary embodiment of the present invention.

Regardless of the particular technique used to classify a call as emergency or non-emergency, if the call is classified as non-emergency then the flow follows the "NO" branch in FIG. 4 and the call is serviced in a conventional manner at block 410, i.e., using the control channel to which the remote unit is currently locked without further evaluation thereof. Otherwise, for emergency calls, the flow proceeds to block 420 wherein the mobile station evaluates the control channel to which it is currently locked to determine if it has been designated to handle emergency calls. According to one exemplary embodiment, only umbrella cells, e.g., cell 10 in FIG. 2, might be designated to handle emergency calls. However, those skilled in the art will appreciate that any one (or a subset) of the cells in a hierarchical cell structure could be designated for handling emergency calls, which would accomplish the objective of reducing the number of adjunct scanning units needed.

This evaluation may be performed by the mobile unit's using the cell characteristics (e.g., public vs. private, maximum transmit power, identity as preferred, non-preferred or regular, etc.) which the mobile unit previously read on the broadcast control channel. Alternatively, an explicit emergency call designation may be provided for each control channel and transmitted over the air interface as part of, for example, the neighbor list in systems designed according to IS-136. If the current control channel has been designated to handle emergency calls, e.g., is a control channel which one or more adjunct scanning units are monitoring, then the flow proceeds to block 425. At this point, the mobile unit sets an indicator identifying the call as an emergency to this system (if such functionality exists, e.g., in the call origination message of IS-136) and transmits the call using this control channel.

Otherwise, if the current control channel has not been designated for handling emergency calls, then the process proceeds to block 430 wherein an appropriate control channel is identified using the same type of information described above with respect to block 420. The mobile unit then tunes to the designated control channel at block 440, sets the emergency call indicator at block 425 and transmits the call at block 430.

While the foregoing exemplary embodiment provides one useful technique for reducing the number of adjunct scanning units used to locate mobile units, there may be certain situations wherein the delay involved in finding a control channel designated to handle emergency calls may be unacceptable. For example, some Systems (e.g., GSM) provide for the mobile unit to be synchronized to the control channels of neighboring cells so that switching to another cell's control channel introduces little delay. In other cases, the delay associated with finding and then synchronizing to a new control channel may be unacceptable for processing emergency calls.

This problem is solved according to a second exemplary embodiment of the present invention, wherein the mobile station stays on the current control channel and transmits with full power despite cell parameters (e.g., whether measured by the mobile unit or sent to the mobile unit on the BCCH) which instruct the mobile unit to do otherwise. In this way an adjunct scanning unit would receive (assuming that the adjunct scanning unit is tuned to this channel) the remote unit's access with approximately the same power as if the remote unit were accessing the umbrella cell.

Figure 5:
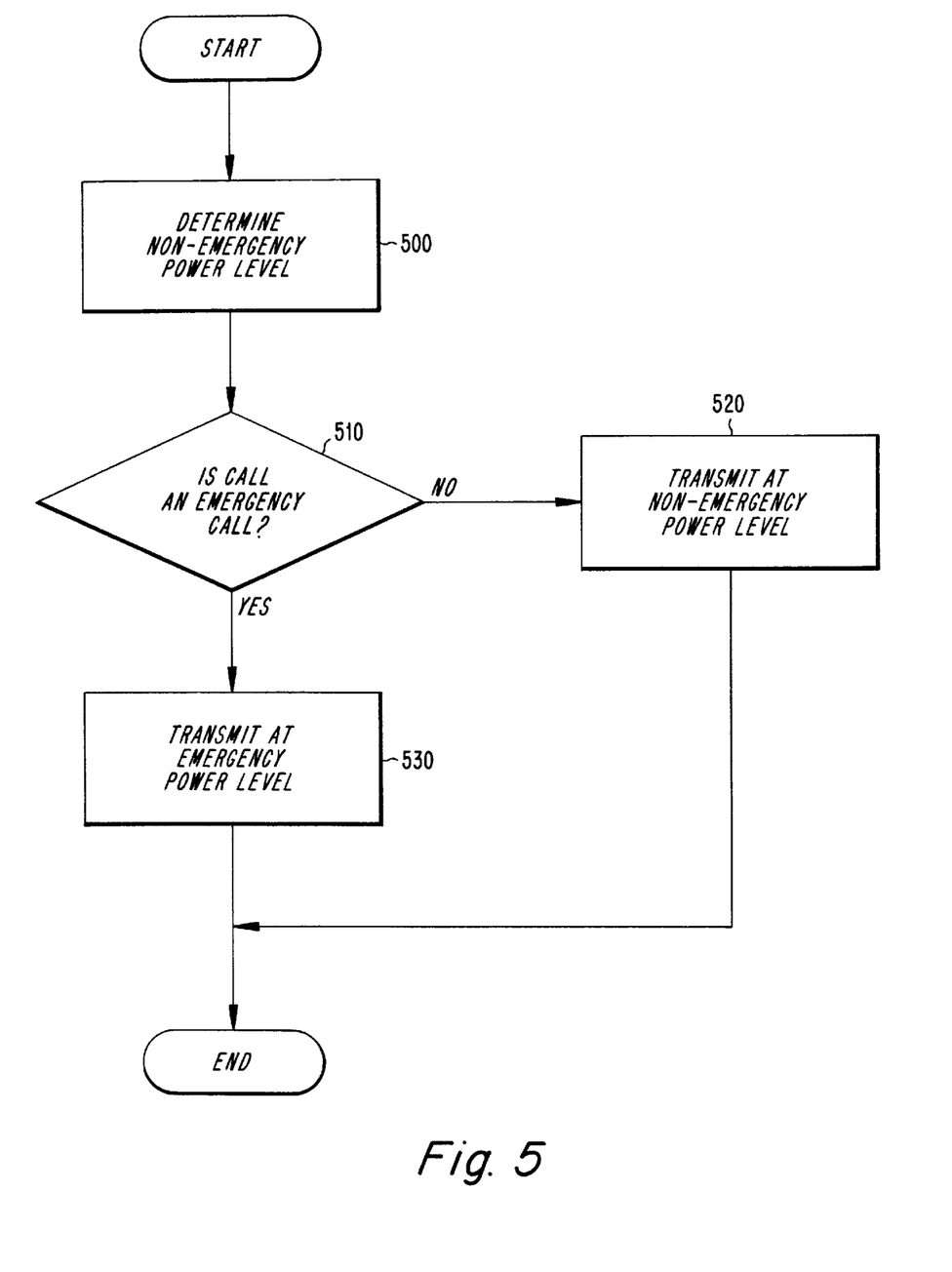
FIG. 5 is a flow chart illustrating a second exemplary embodiment of the present invention.

This exemplary embodiment of the present invention is summarized by way of the flowchart of FIG. 5. Therein, at block 500, the mobile unit determines an appropriate power level for transmitting non-emergency calls. For some low power cells, this power level may be 20–30 dB lower than maximum transmit power, i.e., the power at which mobile units transmit when communicating with the umbrella cell's base station. As mentioned above, the mobile unit may learn this information in a variety of ways including receipt of transmit power level instructions from the base station via the control channel. Next, at step 510, the call to be placed is evaluated to determine if it is an emergency call or a non-emergency call in the manner described above with respect to step 400, which description is incorporated here by reference.

If the call is not an emergency call, then the non-emergency power level (which is likely lower than the emergency power level) is used to transmit at step 520. Otherwise, if an emergency call is being placed then a predetermined emergency power level is used at block 540 which can, for example, be a maximum transmit power level used to transmit in an umbrella cell.

In the future, mobile units which are capable of operating in different modes, e.g., in multiple frequency hyperbands, will be common, just as hybrid analog and digital mobile units are common today. For example, it is anticipated that mobile units will be designed which are operable in hyperbands at 900 MHz and 1800 MHz for GSM, 800 Hz and 1900 MHz for IS-136 and IS-95. Another expected hybrid mobile unit is one which is capable of operating at 900 MHz according to the GSM standard and which also has a satellite mode. Those skilled in the art will appreciate that these are only a few of the combinations that are likely to enter the market very soon. Those readers interested in additional details regarding multi-hyperband capable mobile stations are directed to U.S. patent application Ser. No. 08/425,081, entitled "Multiple Hyperband Mobile and Base Stations", filed on Apr. 19, 1995, the disclosure of which is incorporated here by reference.

Exemplary embodiments of the present invention also provide methods for optimizing emergency call access using these hybrid mobile units. For example, the higher the frequency of operation, the more the transmitted radio signals attenuate. Implementations of higher frequency systems, e.g., PCS 1900 MHz, compensate for the reduced coverage associated with greater attenuation by providing base stations more densely through the region of coverage. Nonetheless, it may be easier to gain access on a lower frequency band than on a higher frequency band. For example, an operator having rights to both a lower and a higher frequency band in a certain geographical area may reserve the higher frequency band for capacity expansion. Thus, the high frequency band may not provide full coverage throughout the operator's service area.

Although the mobile unit, by its cell reselection algorithm, is typically connected to the "best" cell from an overall system perspective, as described above with respect to other types of hierarchical cells, this "best" cell may not necessarily be best for an emergency call. For example, the cell reselection parameters sent on the downlink control channel may be biased to the higher frequency band because there is often more capacity available on the higher frequency band since the lower frequency band was first deployed and is now becoming saturated. However, if the lower and higher frequency bands are received by the mobile unit with the same signal strength, it may often be more reliable to make an access to the lower frequency band. Thus, applying the conventional cell reselection techniques, the mobile unit may be locked to a cell which is not optimal for maximized likelihood of successful access.

Figure 6:
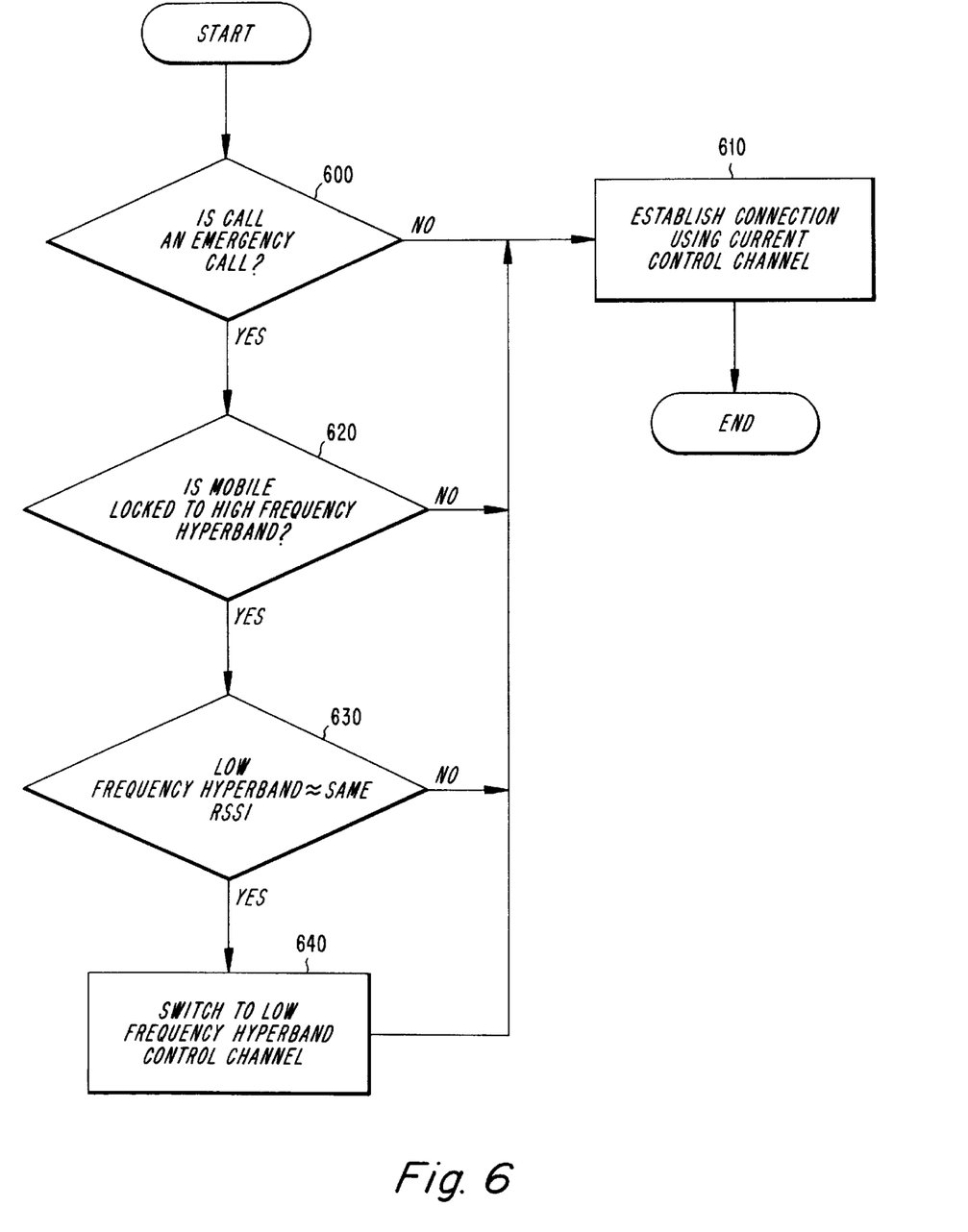
FIG. 6 is a flow chart illustrating a third exemplary embodiment of the present invention.

Thus, according to another exemplary embodiment of the present invention, if the mobile unit has knowledge (e.g., through its standard measurement techniques) about a lower frequency band cell which it receives with about the same signal strength as the current higher frequency band control channel to which it is currently locked, it may switch to this cell when an emergency call is to be placed. This technique is illustrated in the flowchart of FIG. 6.

Therein, at block 600, the mobile unit determines whether a particular call to be placed is an emergency call as described above. If not, the flow proceeds to block 610, where the current control channel is used to access the system. Otherwise, the process continues at block 620 where the mobile unit determines whether the current control channel is associated with a high frequency hyperband (or more generally a less preferred operational mode from an access point of view). If not, then the mobile unit will use the current control channel to make the emergency access.

If so, then the mobile unit proceeds to block 630 where it reviews its evaluation of control channels associated with a low frequency hyperband (or more preferred cell from an access point of view). If the mobile unit receives a control channel from a low frequency hyperband cell with approximately the same signal strength, e.g., within 3 dB, as its current control channel, then the mobile unit will switch to that control channel at block 640 and make the emergency access. Otherwise, if the low frequency hyperband control channel is received too weakly, then the mobile unit remains on the high frequency hyperband control channel to make the access at block 610.

It is, of course, possible to embody the invention in specific forms other than those described above without departing from the spirit of the invention. For example, if the micro cells, or more generally the smallest cells in an hierarchical cell structure, are very small then the situation is further simplified. In this case there may not be any need for the adjunct system to monitor accesses from these cells at all. If the cell size is not larger than the required accuracy of the positioning, it is sufficient to have the cellular system to forward the emergency request, the cell location and the nominal cell size, which will provide the emergency service center with a sufficiently accurate indication of the mobile unit's position.

Thus, the embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method for transmitting emergency calls in a radio-communication system comprising the steps of:

receiving, over an air interface, at least one emergency call number;

detecting input of a key sequence from a keypad of a remote station;

identifying, in said remote station, a call as an emergency call by comparing said input key sequence to determine if said input key sequence matches said at least one emergency call numbers;

determining if a current control channel to which said remote station is listening has been designated for emergency call transmissions;

if so, transmitting said emergency call using said current control channel; and otherwise, switching to another control channel which has been designated for emergency call transmissions and transmitting said emergency call.

2. The method of claim 1, wherein said predetermined key sequence includes a special key provided on said keypad for emergency calls.

3. The method of claim 1, wherein said step of determining further comprises the step of:

receiving, at said mobile station, indications associated with each of a plurality of control channels are designated for emergency calls; and storing said indications; and reviewing said stored indications to determine whether said current control channel is designated for transmitting emergency calls.

4. The method of claim 3, wherein said step of switching to another control channel further comprises the steps of:

identifying said another control channel using said stored indications; and tuning to said another control channel.

5. The method of claim 1, wherein said another control channel is a control channel associated with an umbrella cell.

6. The method of claim 1, wherein said another control channel is associated with a low frequency hyperband.

7. A method for transmitting an emergency call in a radiocommunication system comprising the steps of:

determining whether a remote station is locked to a control channel associated with an umbrella cell; and selectively, based on a result of said determining step, using one of said control channel and a different control channel to transmit said emergency call.

8. The method of claim 7, wherein said step of determining further comprises the step of:

using information received over the air interface relating to neighboring cells to determine if said remote station is locked to a control channel associated with said umbrella cell.

9. The method of claim 7, wherein said umbrella cell is a cell which at least partially encompasses another cell.

10. A remote station comprising:

a receiver for receiving a list of emergency call numbers over an air interface;

a transmitter for transmitting messages over an air interface;

an input device for inputting a number associated with a call to be placed; and a processor for evaluating said number to determine if said call is to one of said emergency call numbers and, based on a result of said evaluation, selectively commanding said transmitter to transmit messages associated with said call using a control channel that has been designated for emergency calls.

11. The remote station of claim 10, further comprising:

a memory device for storing said list of emergency call numbers, wherein said processor compares said number to said list of emergency call numbers to determine if said call is an emergency call.

12. The remote station of claim 10, wherein said input device is a keypad.

13. The remote station of claim 12, wherein said keypad includes a special key associated with emergency calls.

14. The remote station of claim 13, wherein said processor identifies said number as an emergency call based upon the inclusion in said number of a code associated with said special key.

15. The remote station of claim 10, wherein said processor switches from a current control channel to another control channel if said call is identified as an emergency call and if said current control channel has not been designated for handling emergency calls.

16. The remote station of claim 10, wherein said control channel which has been designated for emergency control channels is a low frequency hyperband control channel.

17. A remote station comprising:

means for determining whether said remote station is locked to a control channel associated with an umbrella cell; and means for selectively, based on a result of said determining step, using one of said control channel and a different control channel to transmit an emergency call.

18. The remote station of claim 17, wherein said means for determining further comprises:

means for receiving information over an air interface relating to neighboring cells to determine if said remote station is locked to said control channel associated with said umbrella cell.

19. The method of claim 17, wherein said umbrella cell is a cell which at least partially encompasses another cell.

* * * * *